June 17, 1958 A. M. ZALKIND 2,838,847

SPELLING DEVICE

Filed June 18, 1952 6 Sheets-Sheet 1

INVENTOR.

[illegible signature]

June 17, 1958 A. M. ZALKIND 2,838,847

SPELLING DEVICE

Filed June 18, 1952 6 Sheets-Sheet 2

INVENTOR.

SPELLING DEVICE

Filed June 18, 1952

Inventor

Albert M. Zalkind

June 17, 1958 A. M. ZALKIND 2,838,847

SPELLING DEVICE

Filed June 18, 1952 6 Sheets-Sheet 4

INVENTOR

Albert M. Zalkind

June 17, 1958 A. M. ZALKIND 2,838,847

SPELLING DEVICE

Filed June 18, 1952 6 Sheets-Sheet 5

INVENTOR

Albert M. Zalkind

June 17, 1958 A. M. ZALKIND 2,838,847

SPELLING DEVICE

Filed June 18, 1952 6 Sheets-Sheet 6

INVENTOR

Albert M. Zalkind 2,838,847

SPELLING DEVICE

Albert M. Zalkind, Arlington, Va.

Application June 18, 1952, Serial No. 294,128

13 Claims. (Cl. 35—9)

This invention relates to spelling boards and more particularly to spelling boards wherein children spell words associated with selected pictures.

Among the objects of my invention are to provide a device which can provide spelling training coupled with amusement and which can be easily and cheaply constructed, whereby a child may spell any of a large plurality of words and check his spelling both as to individual letters and correct sequence of letters, by means which affords signals. Additional objects are to provide ruggedness, simplicity of operation, compactness, and manipulative play value.

My invention, in its broad aspect, consists of a series of selective pictures associated with an alphabet means and manually operated means for selecting certain letters pertaining to a selected picture, coupled with means for giving a signal to indicate the correctness of each letter selected in correct sequence.

In certain physical embodiments of my invention I employ cards having pictures printed thereon and provided with perforations at certain points. In conjunction therewith I provide alphabet means comprising panels or cards likewise provided with perforations at various points. In order to correlate the perforations on the picture card with certain designated letters which spell a word to which such perforations pertain, I utilize various means, for example, rotation of a member on which an alphabet may be printed, movement of a stylus arm, manipulation of a contact pointer, and other ways and means hereinafter described in detail. In combination in various ways with the elements described above I may provide metallic plates or foil surfaces which underlie the picture cards and the alphabet elements together with battery and lamp or buzzer arrangements whereby a signal can be effected subsequent to selection of each letter to verify whether or not each selection is correct. Other signal means such as printed dots may be used which become visible through peep holes to indicate correct selection of individual letters.

Figures 1, 2, 2A, 2B, 3:
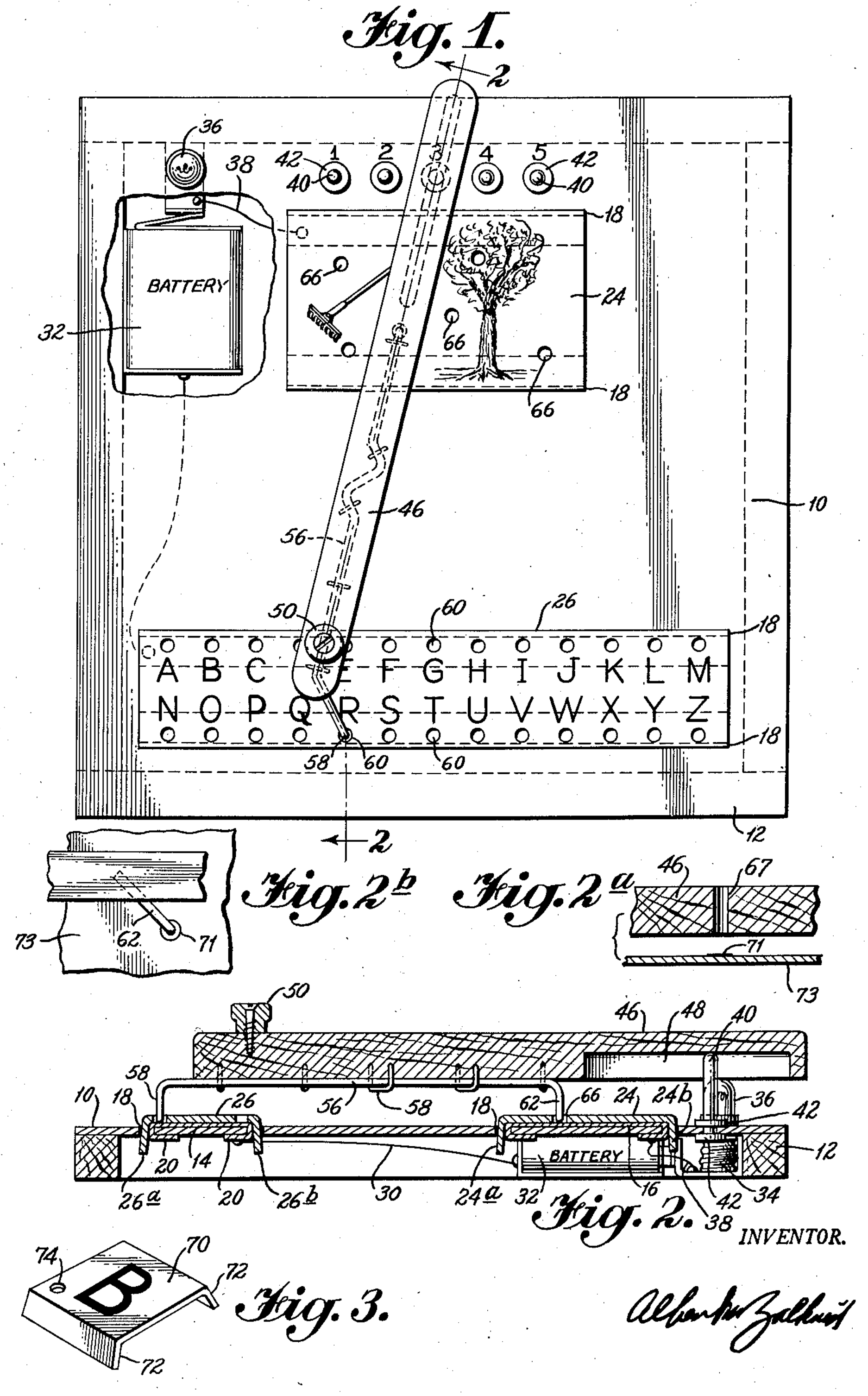
Figure 4:
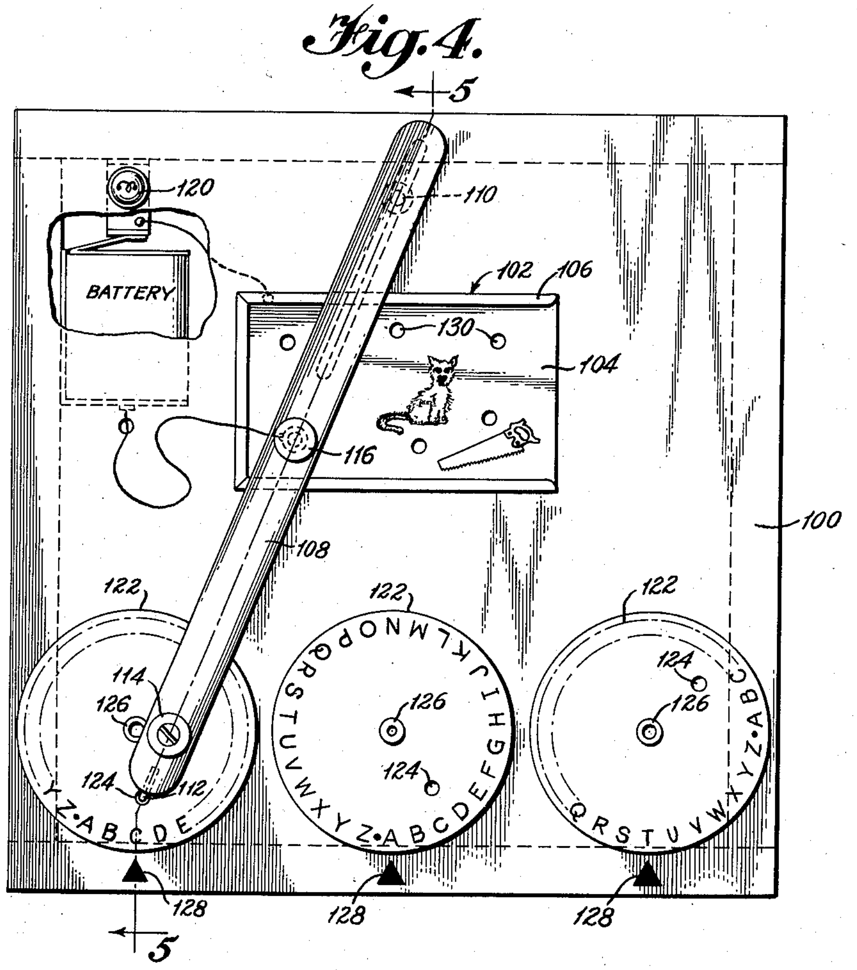
Figure 5:
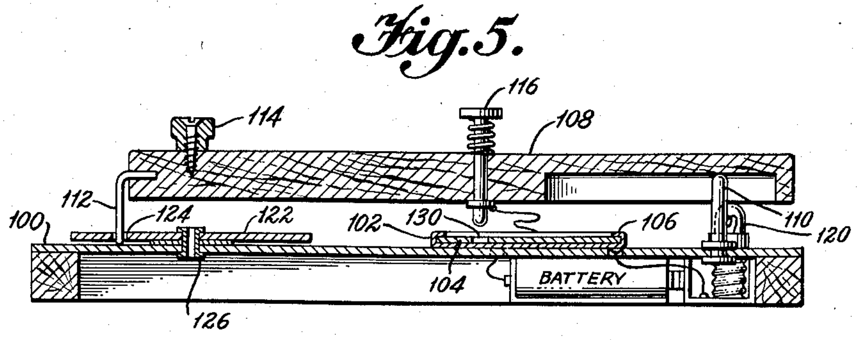
Figures 6, 7:
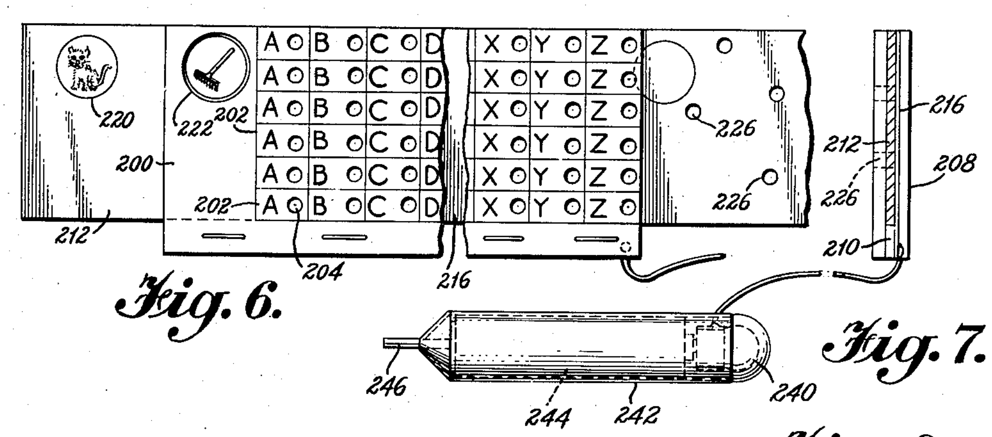
Figures 8, 9:
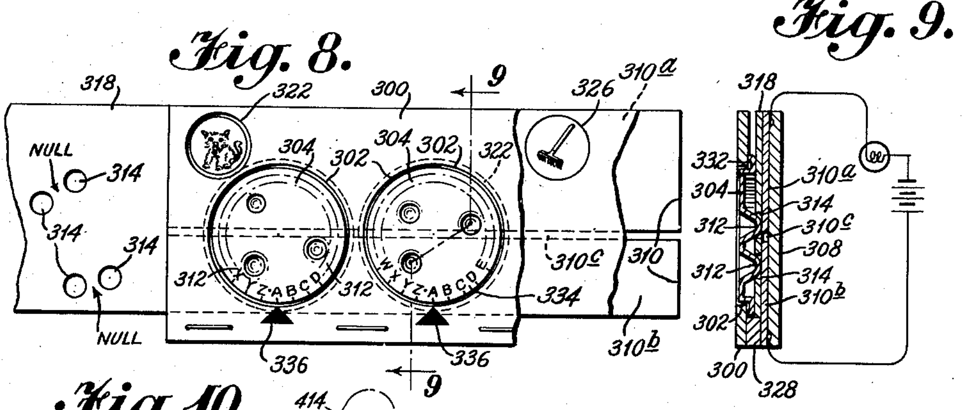
Figures 10, 11, 12:
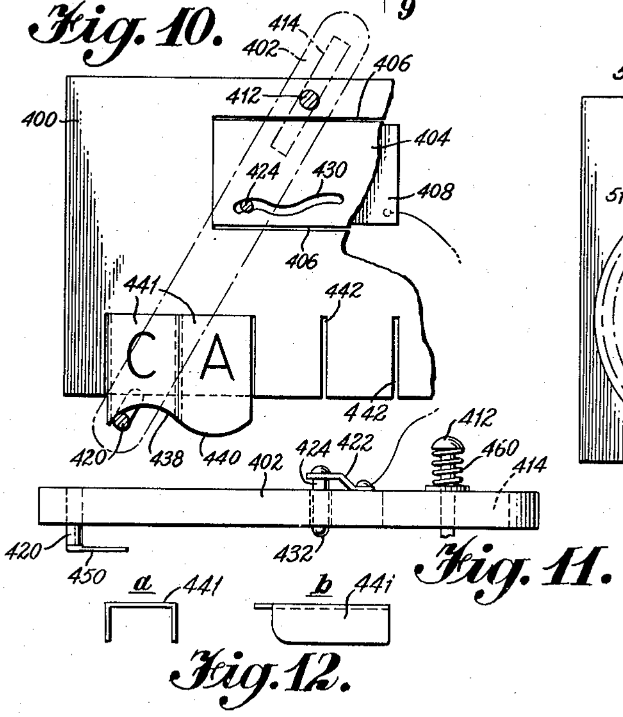
Figure 13:
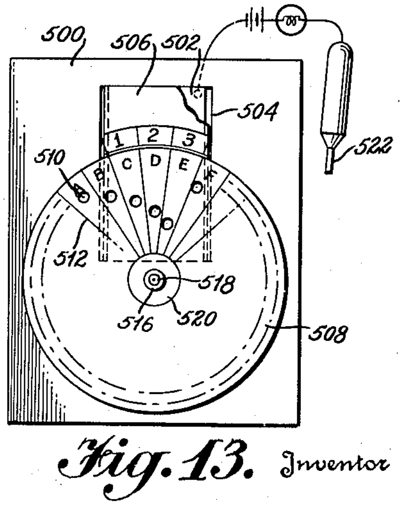
Figure 14:
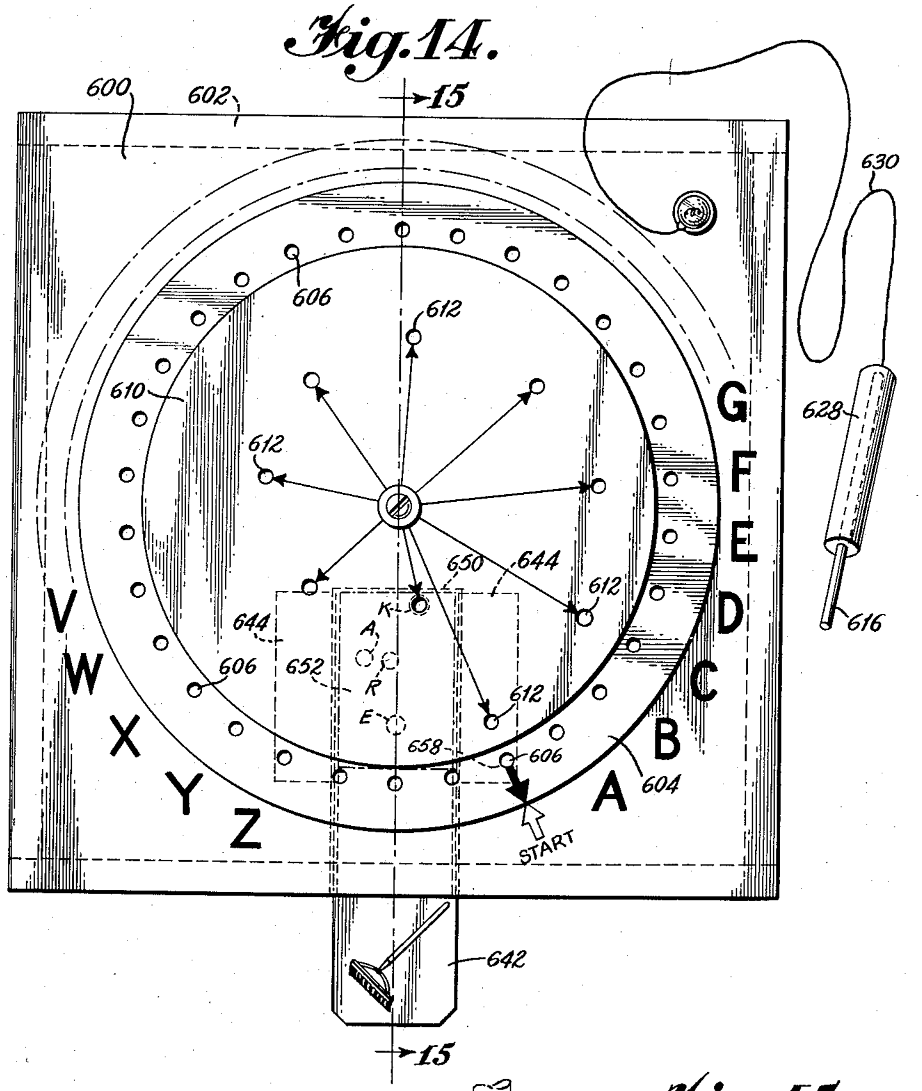
Figures 15, 16:
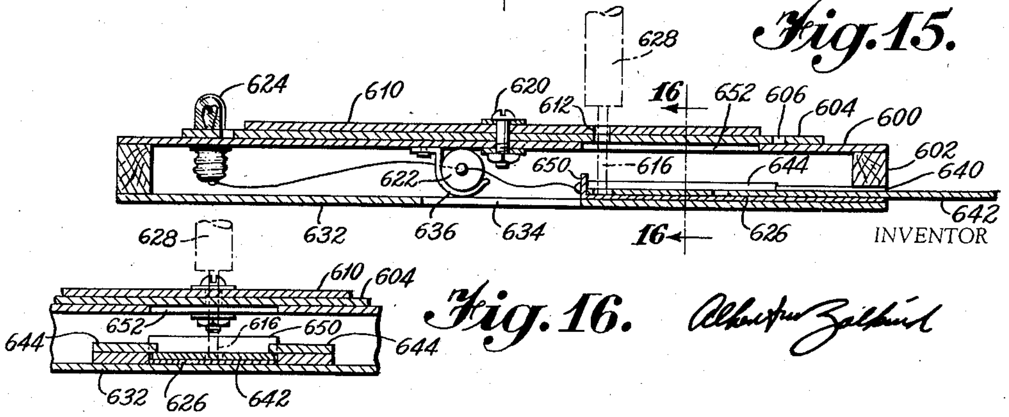
Figure 17:
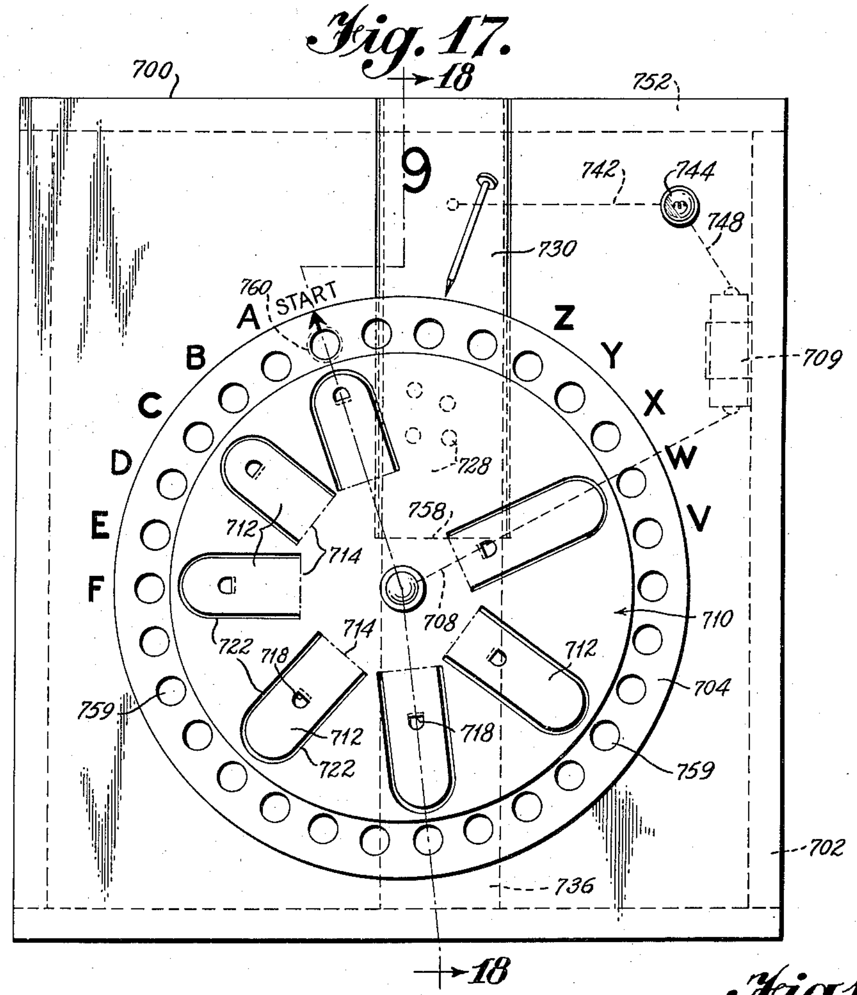
Figures 18, 19:
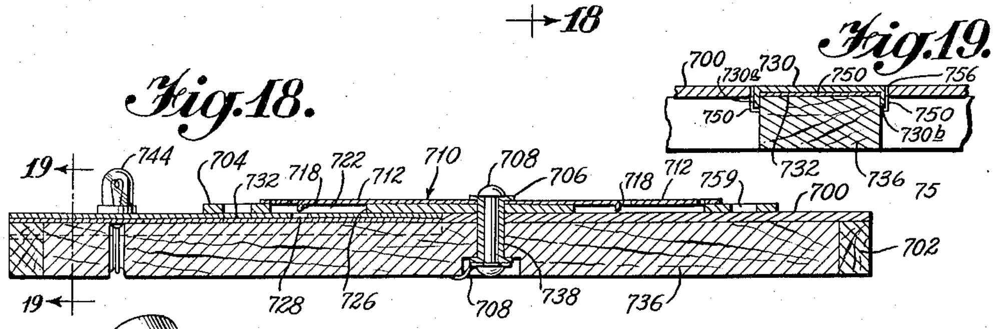
Figure 20:
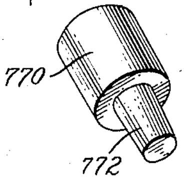
Figure 21:
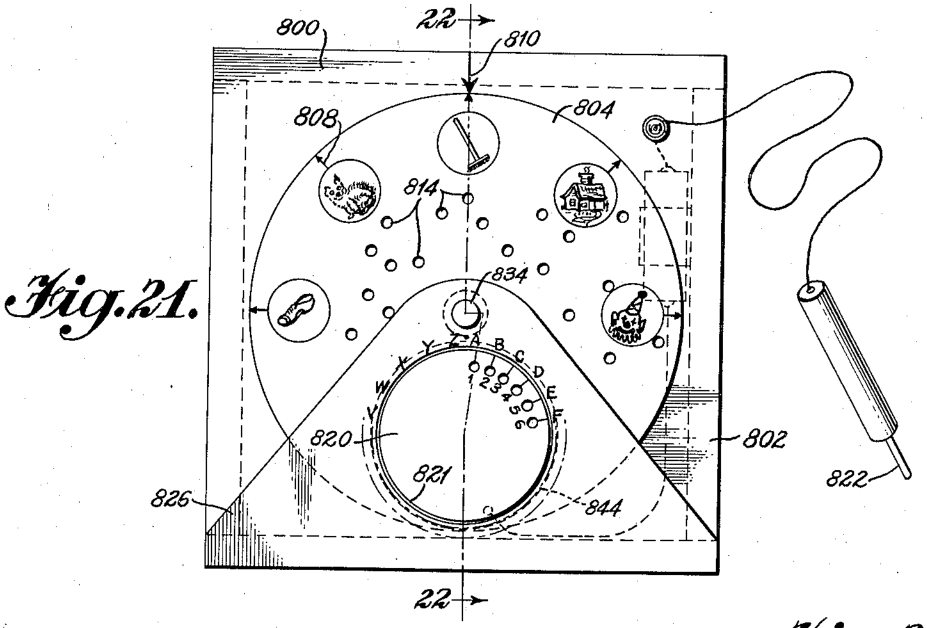
Figures 22, 23, 24:
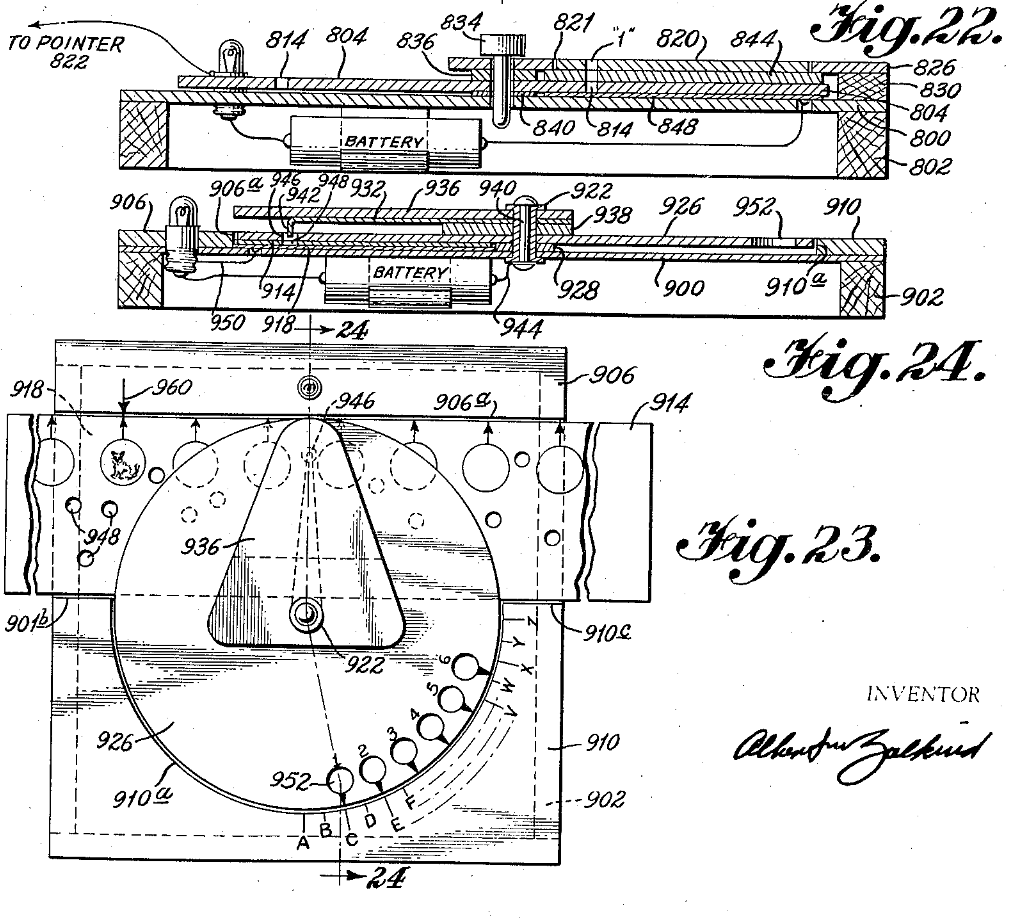

My invention will now be described in detail in conjunction with the appended drawings in which:

Figure 1 is a plan view of an embodiment using a swinging and slidable stylus arm and a stationary alphabet means, Figure 2 is a section through 2—2 of Figure 1, Figure 2*a* is a modification of a certain portion of the device of Figure 1, Figure 2*b* is another modification of a portion of the device of Figure 1, Figure 3 is a modification of the alphabet means shown in Figure 1, viewed in perspective, Figure 4 is a plan view of another embodiment using a swinging and slidable stylus arm, wherein a series of rotary alphabet disc are utilized, Figure 5 is a section through 5—5 of Figure 4, Figure 6 is a plan view of another modification wherein a series of fixed alphabets are used in connection with a contact pointer, Figure 7 shows an end view of Figure 6, Figure 8 is a plan view of an embodiment of the invention using a plurality of alphabet discs which are rotatable and carry contact elements, Figure 9 is a section through 9—9 of Figure 8, Figure 10 is a plan view of an embodiment characterised by the use of a wavy shaped perforation in the picture card coupled with letter elements having wavy edges, Figure 11 is an elevation of the stylus arm used in Figure 10, Figures 12*a* and *b* show front and side views respectively of the letter elements of Figure 10, Figure 13 is a plan view of a further modification in which a rotary alphabet disc is utilized having perforations arranged in spiral formation for reception of a contact pointer, Figure 14 is a plan view of an additional modification employing a rotary disc having perforations for receiving a contact pointer and having a circularly disposed and relatively stationary alphabet, Figure 16 is a section through 16—16 of Figure 15, Figure 17 is a plan view of a further embodiment comprising a rotary disc carrying spirally arranged contact points wherein the disc is set at certain rotated positions in accordance with a surrounding and relatively fixed alphabet, Figure 18 is a section through 18—18 of Figure 17, Figure 19 is a section through 19—19 of Figure 18, Figure 20 is a perspective of an element optionally usable in conjunction with the embodiment of Figure 17, Figure 21 is a plan view of still another modification utilizing a rotary picture disc in conjunction with a rotary disc having perforations therethrough for positioning a contact pointer in accordance with selection of letters of a relatively fixed alphabet, Figure 22 is a section through 22—22 of Figure 21, Figure 23 is a plan view of yet another form of the invention utilizing a rotary disc which carries a switch arm, which disc is positioned in accordance with a relatively fixed alphabet, and Figure 24 is a section through 24—24 of Figure 23.

The form of the invention shown in Figures 1 and 2 comprises a base 10 of cardboard, or the like, secured to a wood frame 12 and carrying metallic plates 14 and 16 having flanges which pass through slots 18 in panel 10 and which are bent upwardly, for example, as at 20 so as to be permanently secured to the panel. The slots 18 are of sufficient width to take the turned down edges of the picture card 24 which is superimposed over metal plate 16 and the alphabet card 26 which is superimposed over metal plate 14. Thus the flanges 24*a* and 24*b* are thrust downwardly through respective slots 18 taking the positions shown in Figure 2, which figure also shows the folded down flanges 26*a* and *b* of alphabet card 26. Accordingly, it will be apparent that alphabet card 26 and picture cards 24 which are furnished in selective plurality are readily removable from panel 10.

Metal plate 14 is connected by wire 30 to a terminal of a battery 32, the other terminal of which is connected to the base 34 of a lamp socket which carries a lamp 36. A lead 38 runs from the other terminal of the lamp to metal plate 16. It will be apparent that any metallic element contacting plates 14 and 16 will close a series circuit energizing lamp 36. The particular mode of connecting the electrical elements described may be by soldering, clip, etc. and is a matter of choice.

Rigidly secured to panel 10 are a series of studs 40 aligned in spaced formation as shown in Figure 1, designated "1"—"5" on the panel. The studs 40 may be secured to the panel in any suitable manner as by nuts threaded on the end thereof, or pressed flanges, as shown by the flanges 42 of Figure 2, it being understood that the lower flange is formed by deforming the bottom of the studs. The studs, however, form no part of the electrical circuit but serve successively as fixed guides for the sliding and rotation of a stylus arm 46 which may be of wood and which has a groove 48 milled therein affording a smooth sliding fit with any of the studs 40.

The arm 46 carries a button 50 with which it can be manipulated so as to slide on any studs 40 and also rotate thereon. Arm 46 is completely removable from any stud by merely lifting it upwards so as to provide access for removal of cards 24 and 26 and also to prevent injury to the various elements, which might otherwise occur upon forced upward motion of arm 46 if permanently secured to the other elements, and further for providing for the shifting of arm 46 successively from one to the other of studs 40 in the course of spelling a word, as will be explained below.

Arm 46 carries a heavy wire or a bent rod 56 stapled thereto as by staples 58 and has a forward end 58 bent sideward for improved visibility and downward to be manually engaged in any selected perforation 60 of the alphabet card 26. The rear end of the element 56 is bent downwardly at 62 so as to engage perforations 66 in picture card 24.

Accordingly, it will be understood that when the section 58, that is, the pointer of stylus arm 46 is put through a perforation 60 on the alphabet card it will engage the metal plate 14. At the same time the pointer section 62 will engage plate 16 through a perforation 66 in picture card 24. Thus, if the perforations in picture card 24 are disposed thereon in proper relationship with the perforations of the letter card so as to correspond to the positions of certain letters which spell the names of selected pictures, each letter thus selected will result in a connection between the two metal plates via element 56, causing the lamp 36 to light.

For example, in Figure 1 the picture card has a picture of a rake and a tree thereon, and for purposes of illustration various perforations 66 are shown representing the positions of contact point 62 when the stylus pointer 58 is protruding through certain perforations 60 of the alphabet card. The specific illustration does not necessarily show the exact positions for the perforations corresponding to the letters of the words "tree" and "rake" but persons skilled in the art would have little difficulty in determining exact positions and in making up a large series of picture cards.

Depending on which of the studs 40 the arm 46 is disposed, the positions of the various perforations 66 are determined. Thus, if arm 46 is disposed on stud "1" the perforation 66 corresponding to say the letter R, when pointer 58 is at the R position, would be in a place somewhat different from where such perforation 66 would fall for the letter R were arm 46 on stud "2." Accordingly, it will be seen that the provision of a plurality of studs which shifts the position of corresponding perforation 66 for all letters of the alphabet may be utilized to detect errors in spelling sequence. Thus, if the word "rake" is to be spelled, arm 46 is disposed on stud "1" and pointer 58 disposed through the perforation 60 corresponding to the letter R. At that time pointer 62 will go through a predeterminedly disposed perforation 66 and establish a series circuit lighting the lamp. Progressing now to the second letter of the word, A, arm 46 is disposed on stud "2" and the letter A sought out with pointer 58, and so on until the entire word has been spelled. For each letter selected the arm 46 is on a different stud 40. Assuming that the word has been properly spelled a signal will be effected for each letter selected. If, however, an incorrect letter is chosen or if the spelling sequence is wrong the pointer 62 will not be disposed through a perforation 66 but will ordinarily merely engage the insulating surface of the picture card, resulting in no signal and thus indicating an error. Since each letter is selected and tested in sequence the occurrence of an error is immediately detected.

It will of course be apparent that the device may be utilized with a single stud 40, for example, the stud designated "3." This would result in simplified operation in that the arm 46 would not have to be moved from stud to stud, but such simplification would sacrifice the detection of errors in letter sequence. It has been found, however, that there are certain advantages in the faster operation afforded by use of a single stud and this expedient is regarded as wholly practical, if desired. Obviously, a different set of picture cards would be required.

Instead of alphabet card 26, a series of separate letter cards such as shown in Figure 3 can be used consisting of a short panel 70, on which a letter is printed, the panel having folded down side flanges 72. Each letter card would have a perforation 74 provided therethrough, the perforations being disposed at a different spot for each letter. Thus no two letters would have its perforation in exactly the same place. Accordingly, referring to Figs. 1 and 2, in place of alphabet card 26 words may be made up by assembling selected letters of the type shown in Fig. 3 which are then placed in position on metal plate 14 the flanges 72 being inserted in slots 18 to hold the letters in position. In such instance sequence detection of errors is afforded by virtue of the fact that each letter has its perforation in a different place and the corresponding perforations on the picture card are located accordingly. In such case the arm 46 is used in conjunction with a single stud.

It will be appreciated that a buzzer may be used in conjunction with lamp 36 or in place of a lamp. Further, the structure of the embodiment described would even be usable without the electrical circuit elements. For example, instead of a pointer 62, a peep hole 67 could be provided through arm 46 axially aligned with the previously existing position of 62, so that a child could peep through the hole 67, as shown in Fig. 2*a*, and have a line of sight directly down to a printed dot such as the dot 71 on a picture card 73. Thus the device would be entirely mechanical and optical in nature, printed dots being substituted for perforations. Alternatively, the pointer 62 could be bent outwardly so as to emerge from under the arm 46 in much the same manner as the pointer 58 is positioned relative thereto, whereby pointer 66 would directly indicate printed dots such as the dot 71, see Fig. 2*b*. In such case it would, of course, not be necessary to extend the electrical connection between the two pointers since the device would then be entirely mechanical.

In Figures 4 and 5 is disclosed a modification comprising a panel 100 carrying a card holder 102 for holding removable selective picture cards such as 104. The holder is made of sheet metal and provided with upwardly and inwardly turned flanges 106 for securely holding a card in fixed position therein. A stylus arm 108 is utilized swingable and slidable on a stud 110 which stylus arm carries a pointer 112, a button 114, and a spring biased depressible switch contact element 116. The electrical circuit is understood to be such that when 116 is pressed downwardly so as to engage plate 104, a series circuit is established to energize a lamp 120.

A series of rotary discs 122 are provided, each of which carries a peripheral alphabet, and each disc is provided with a perforation 124 through which pointer 112 may be placed, although no electrical contact is established thereby.

The alphabet discs may be rotatably mounted as by eyelets 126, with suitable friction so as to hold their respective positions when each in turn is rotated to align a selected letter with respective printed indicia marks 128 printed on panel 100.

It will be apparent that if the discs 122 are rotated to bring selected letters in alignment with respect to respective indicia marks so as to spell a word corresponding to a selected pictured on the picture card, the pointer 112 can be brought into engagement with the several perforations 124 so as to provide for successive positions of arm 108. If element 116 be depressed at each successive position of arm 108, contact will be made with plate 104 through a perforation 130 provided in plurality in the picture card. Accordingly, if the perforations 130 are arranged in an appropriate pattern corresponding to a designated word as determined by the various positions taken by perforations 124 in the spelling of such word, each letter may be checked for correctness. By virtue of the use of a plurality of discs, detection of errors in letter sequence is inherent in the combination.

In the form of the invention shown in Figures 6 and 7, I provide a cardboard panel 200 having a series of alphabets 202 printed horizontally thereacross, each letter thereof being provided with a perforation 204. Panel 200 is stapled to a backing 208 through a spacer 210 so as to form a space into which an elongated picture card 212 may be slid underlying perforations 204. Backing 208 has a metal or foil surface 216 secured thereto and as shown in Fig. 7 the upper edge of the device is left open between elements 208 and 200 so as to facilitate insertion of picture card 212 therebetween.

It will be apparent that card 212 will carry a plurality of pictures for example, in printed circles 220, which may be registered successively with a circular hole 222 provided as shown in panel 200. A smooth sliding fit is provided for card 212 between elements 208 and 200, the car passing continuously over the surface of foil or metal 216. The card is provided with perforations 226 adapted to be aligned with certain perforations 204 in accordance with whatever picture is selected by registration with aperture 222. Metal surface 216 is connected to one terminal of a lamp 240 carried in a contact pointer 242 which also houses a battery 244 and has a metallic pointer 246 arranged to be connected with one terminal of the battery. The other terminal of the battery engages the other lamp terminal, all as indicated in Fig. 7.

In use, a picture is selected so as to show through window 222 and the corresponding word is spelled by pushing pointer 246 through a selected letter perforation in the top alphabet, thence to the next selected letter of the alphabet thereunder, and so on. It will be understood that the perforations 226 are disposed so as to permit pointer 246 to pass therethrough to contact metallic surface 216 for each letter correctly selected, thereby energizing lamp 240 to give a signal in each instance. Panel 200 may be made sufficiently thick and the holes 204 sufficiently small in diameter as to preclude any possible light reflection from the metallic surface, so as to assure honesty on the part of the child. Another expedient would be to color the face of the picture card in a metallic hue whereby it will give substantially the same reflection as metallic surface 216. A third expedient, as has indeed been found practical, is to use a thicker spacer 210 of about ½ inch, to provide a relatively wide gap between the panel and the backing plate. With the picture card arranged to rest on the metal surface, it is extremely difficult to ascertain whether or not a perforation 226 lies directly below one of the perforations 204, owing to parallax. Further, the space between the panel and back plate can be entirely enclosed to prevent light entry.

In the form of the invention shown in Figs. 8 and 9, I utilize a front panel 300 in which is a series of circular cutouts 302 to provide bearing surfaces for metallic discs 304. The discs are carried between panel 300 and a backing member 308 having a metallic surface 310 engageable with dimples 312 of the discs. The dimples are shaped as to be able to pass through perforations 314 provided in picture card 318 which is slidable between the discs and metallic surface 310. Panel 300 has a window 322 through which the pictures can be revealed, being brought in register with window 322 for selection. Each picture has a printed ring 326 surrounding it so as to assure perfect registry with window 322.

The front panel and backing element are secured together as with staples, and sandwiched therebetween is a spacer 328 affording a suitable gap so that picture card 318 may be pushed therebetween from the top, which is open, and then slid in the direction of its length. The metal discs 304 have sufficient looseness in the sandwich structure so that dimples 312 will not seriously impede widthwise entry of card 318. Preferably a flange 332 surrounds the periphery of each disc 304 to prevent the disc from falling out of its aperture in the panel and the edge of the flange is turned or beaded so as not to catch the edge of a card 318 when it is inserted.

Dimples 312 are angularly spaced so that at any time at least one of such dimples is disposed above and another below the horizontal diameter of the disc. Each disc is provided with an alphabet printed adjacent the rim thereof, as indicated at 334 whereby the letters may be aligned with respect to fixed indicia marks 336.

The metallic surface 310 actually consists of two surfaces in the same plane designated as 310*a* and 310*b*, separated by a gap 310*c*. As shown in Fig. 9, the surfaces are connected up through suitable leads to a lamp and battery. Thus if a metallic conductor engages the surfaces across gap 310*c* a series circuit is established to energize the lamp.

Since the inner ends of dimples 312 may engage surfaces 310*a* and 310*b* through perforations 314 depending upon rotated positions of discs 304 and the positions of apertures 314, it will be appreciated that series circuits may be established by any of the discs 304 in any selected letter position thereof. The arrangement of the dimples 312 on any disc 304 is such that no two dimples of a disc lie on the same diameter or have the same radius from the disc center. Thus it is not possible to short the metallic surfaces 310*a* and 310*b* by virtue of 180° rotation of any disc 304 so as to give a false signal, for example, by substitution of the letter A for the letter M. It would otherwise be necessary to use an irregular letter spacing, or else use an incomplete alphabet of an odd number of letters, such as twenty-five, so that no two letters would be on the same diameter. Further, the use of three dimples gives a greater choice as to where apertures can be placed in the card so that they can be better spaced. The three dimple arrangement of each disc is such that for any selected letter position two dimples, one above and the other below the horizontal diameter, will come into play for the purpose of completing the circuit across the gap 310*c*. Further, the dimple arrangement of the discs is such, preferably, that each dimple is at a different radius within practical design possibilities. This to afford a maximum card area in which to dispose the perforations 314 so as to minimize possibilities of false signals which would occur more frequently if the dimples 312 were all equally spaced from the centers of the discs. Thus if the device is made for four rotary discs, each having three dimples, there would be a total of twelve dimples, each preferably being at a different radius from the common horizontal diameter, and accordingly no two discs would be alike. Alternatively, discs with two dimples on the same diameter could be used, but the dimples should be at unequal distances from disc center.

The structural arrangement is such that there is sufficient looseness and flexibility for the discs that they may be pressed at their centers so as to insure the points of the dimples passing through underlying apertures for engagement with metallic surfaces 310*a* and 310*b*. If desired, the disc may be dished slightly outwardly, as viewed on Fig. 9, so that upon being depressed at their centers they will flex to effect passing of the dimples through the apertures 314. While not clearly visible on Fig. 9, the general looseness of the structure must be such that cards 318 can slip past the dimple points widthwise without buckling, which may be procured by suitable design and choice of materials. Alternatively, the discs may be made of sufficiently resilient material and dished outwardly enough so that the points of the dimples actually will not engage the picture card at all when it is inserted widthwise.

Inasmuch as the discs are made of metal, they would constitute a continuous short across the metallic surfaces 310*a* and 310*b* if left in position at a selected letter if the apertures 314 were arranged as in previous embodiments wherein each aperture would cause signaling when a respective letter was brought to a reference point. Further, it would not be possible to sequentially test each letter without moving the preceding disc away from the signal giving position, which while not serious, would result in the loss of formation of a complete and correctly spelled word for final viewing.

A method of overcoming this would be to isolate electrically and successively switch in the area portions of the metallic surfaces 310*a* and 310*b* which are associated with each disc 304, or at least the area portion of either surface 310*a* and 310*b*. This could of course be done by simply providing gaps in surface 310*b*, between the discs, and then providing means for switching the battery lead to each of these segments of area 310*b*. There would thus be effected a plurality of metallic surfaces one for each disc rather than a single continuous surface.

However, I prefer a more economical and less complicated expedient wherein I provide two apertures 314 for each side of the disc, thus furnishing four apertures per letter. The arrangement of the apertures is such that the test for each letter consists in rotating the respective disc 304 to the preceding letter, receiving a signal, then rotating the disc to the next succeeding letter, receiving a signal, and then setting the disc precisely at the selected letter. This results in one of the operative dimples 312 engaging a null point between apertures. Disposition on a null point will effectively cut the current otherwise produced by that particular disc, while at the same time permitting positioning of the selected letter precisely at the indicia mark so that the feature of forming a complete and correct word for final viewing is not lost.

Thus the test for each letter is a null point intermediate a pair of signals rather than a signal itself. While I have stated that in testing a letter the disc is swung to the preceding letter and then to the next succeeding letter, it will of course be understood that the degree of swinging is purely a matter of design not depending on the angular spacing between letters on the disc.

The illustration of Figures 8 and 9 is in no way intended to represent an actual working drawing, but is believed to fully serve the purpose of disclosing the principles and features involved. For example, the dimples 312 have points which appear so wide that they appear capable of individually bridging the gap 310*c* when disposed along a horizontal diameter. This is, of course, not desirable and obviously the points or apices would in a commercial embodiment be made smaller than the width of gap 310*c*. Such considerations are well within the knowledge and experience of people skilled in the art.

If desired, the word corresponding to respective pictures may be printed therebelow, as shown, so that while concealed during the course of operation they can be previously viewed and studied by sliding card 318 to the left.

In the form of the invention shown in Figures 10, 11 and 12 a panel 400 is provided with a slidable swinging arm 402, shown in phantom on Fig. 10, and a picture card 404 is slidably removable or insertable in slots 406, wherein the arrangement shown either in Fig. 1 or Fig. 4 may be utilized. In either event, the picture card overlies a metallic surface 408 all in accordance with description heretofore given in connection with Figures 1 and 4. The slidable arm is carried and guided in a manner heretofore described in connection with Fig. 2, for example, on a stud 412, there being a slot 414 cut directly through the arm as shown in Fig. 11. The outer end of the arm carries a stylus pin 420 while intermediate the length of the arm a small leaf spring 422 supports a metallic contact element 424, the spring being riveted or otherwise secured to the arm as shown. A battery and lamp are connected in series with plate 408 and contact member 424. Thus it will be apparent that engagement of 424 with 408 will energize the lamp. The picture card 404 has in this instance a wavy slot or perforation 430 cut therethrough and the lower tip 432 of member 424 is rounded and smooth so that it can follow the slot and may have continuous contact with the metal surface therebelow, or ride past the edges of the slot in the event arm 402 is not correctly moved so as to maintain the continuous engagement in the slot.

Arm 402 is guided in its motion by means of a wavy edge comprised of a series of wavy edges such as 438 and 440 provided on letter cards 441 held in position on panel 400. The letter cards corresponding, e. g., to the letters C and A have side flanges as shown in Fig. 12*a* and 12*b* and fit snugly and securely in slots 442 provided in the edge of panel 40. Thus the slots between any two letters accommodates the thickness of a side flange of each letter as will be apparent.

When the stylus element 420, which may be rotatable on its axis or provided with a rotatable sleeve, is thrust against the left end of wave edge 438 and then maintained in engagement therewith as it is moved to the right it will follow the composite wavy edge formed by the plurality of letters selected. Since the wavy slot 430 is cut to conform on a smaller scale to the composite wavy edge effected by the selected letters, the spring biased member 424 will make continuous contact through the slot with metallic surface 408. If a wrong letter has been selected the wavy edge thereon will not conform with the corresponding shape of the slot and the tip 432 will ride out of it onto the insulating card surface and the signal will cease.

It is contemplated that each letter of the alphabet will have a distinctive and characteristic wavy edge provided for it and that each such edge will begin and end at precisely the same distance from the lower edge of panel 400 so that there will be no sharp abutting of the stylus 420 with the side of any letter as it passes from letter to letter. The arrangement is as indicated on Fig. 10 showing how the curve for edge 438 comes up to a point where it joins fairly smoothly with the curve 440. It will be appreciated that a large variety of protruding hills and receding valleys is possible in designing the letter edges so that no two letters will have their edges sufficiently similar to effect a false signal.

It is preferable that the letter pieces be made of very stiff cardboard, plastic or sheet metal so as to be suitably durable under the constant and repetitious engagement of the stylus 420 riding against the wavy edges thereof.

If desired, stylus 420 may be provided with a reentrant flange 450 to prevent inadvertent lifting up of the stylus 402. The distance between flange 450 and the lowest surface of the arm can be such as to afford a smooth sliding fit with the edges of the letters, which then protrude sufficiently to keep flange 450 from striking the vertically disposed side flanges.

While it is contemplated that arm 402 will have sufficient weight to maintain proper engagement of contact 424 with plate 408 there may, of course, be provided a biasing means on the upper end of stud 412 above the arm and bearing down on the sides of slot 414, as indicated by the spring 460 of Fig. 11.

The form of the invention shown in Figure 13 has a panel 500 having a metallic plate 502 and cardholding slots 504 for holding a card 506 on which a picture is to be printed, the arrangement being as shown for the corresponding elements of Fig. 1 all as to heretofore understood. In this instance, I provide a rotary alphabet disc 508 having a complete alphabet printed around the rim thereof, as indicated, wherein each letter is provided with an aperture 510 and is set off by printed sector lines 512. The layout of the apertures is spiraled and such that no two letters have their apertures in precisely the same position in their respective printed sectors. It will understood there would be a plurality of spiral formations of apertures, e. g., letters A through F occur on the first spiral as shown.

The disc 508 is provided with a knob 516 having a bore 518 and rotatively engaging a stud 520 secured in any suitable manner to panel 500 so that the disc may be removed therefrom for insertion and removal of selective picture cards, such as 506. Each picture card is printed with arcuate sectors such as the sectors "1," "2" and "3" so that the disc 508 can be rotated to register any letter arc with any numerical arc on the card. In the present instance, the arrangement is for three letter words since only three letters can be registered with a card designed as shown.

The usual apertures and printed pictures are provided on the card all as heretofore disclosed, the picture being above the arcuate designations "1," "2" and "3" and the apertures being therebelow so as to be registerable with the apertures in discs 508 in accordance with the positioning of such disc in spelling a word. For example, if the picture shows a cat, the letter C is brought into register with arcuate sector "1" and a contact pointer 522 is then pushed through the aperture for the letter C and passes through the assumingly correctly positioned aperture (not shown) on the card, to engage metallic surface 502. The electrical arrangement of the lamp, battery and pointer is precisely as shown heretofore for example, in Fig. 7, plate or foil surface 502 being connected to one side of the battery as indicated.

By providing the arcuate sectors "1," "2" and "3" printed on the card each letter must in turn be brought to bear in proper sequence in order to receive a signal. Thus the first letter of a word is brought to register with "1," the test made with the pointer, then the second letter of the word is brought to register with "2," the test made with the pointer, and finally the third letter of the word is brought to register with "3" and the test made with the pointer.

It should be pointed out that the combination is operable even without the sequence error detection system afforded by arcuate sectors "1," "2" and "3," a single indicia mark being then used on the card for registering the letters therewith, or such indicia mark may be used anywhere on panel 500 as a reference point. Further the arcuate printed sectors "1," "2" and "3" need not be on the card, but could also be printed anywhere on the panel adjacent the periphery of the disc.

In the form of the invention shown in Figures 14, 15, 16 I provide a cardboard panel 600 reinforced by a wood frame 602 and carrying a rotary cardboard element 604 having near its periphery a series of thirty equally spaced perforations 606. Cemented to the rotary element 604 is a concentric cardboard disc 610 carrying a spiralling arrangement of apertures 612 which continue through registering apertures in the lower plate 604. Thus a point 616 of a contact pointer can pass downwardly through the integral assembly of the two discs which are pivoted at their center as by a bolt 620 to panel 600. The purpose of using a composite rotary member having a stepped formation is to effect a clear distinction between apertures 606 and 612. However, a single flat disc could be used if desired. A battery 622 and lamp 624 are furnished connected in series with a metallic surface 626 and with pointer 616 and it will be understood that when the pointer engages the metallic surface a series circuit is completed energizing the lamp.

The pointer 616 has a handle 628 for easy holding and a flexible lead 630 comes out through the end of the handle so as to provide a connection between 616 and the other electrical elements, for example, in this instance it is shown as connected to a terminal of the lamp.

The wood frame 602 is covered at its bottom with a cardboard panel 632 having an aperture 634 affording access to the battery for replacement when necessary. The battery may be held in a spring clip 636 and suitable terminal clip connections (not shown) utilized. The front wood strip forming part of the frame is dadoed with a slot 640 of sufficient width to take a flat picture card 642 which may be inserted therethrough so as to rest on plate 626. Suitable guides 644 which may be cardboard or wood, or even turned in flanges of member 626 if it be made out of sheet metal, are provided to keep the card from buckling while being inserted and to insure proper positioning. The card is of sufficient length that it may completely cover metallic surface 626 and abut a stop flange 650, while at the same time protruding outwardly so as to render a picture printed at the outer end visible.

Thus it will be apparent that any one of a series of cards may be selected for insertion into the slot 640 and properly positioned below a working area of the rotary element. The card is apertured so that the apertured area lies below a rectangular cutout 652 in panel 600. This cutout is illustrated in dot-dash lines in Fig. 14 and substantially exposes the working or apertured area of the card so that the contact point 616 may be thrust through any of the holes 612 when such hole is positioned over cutout 652. In the particular example is shown a picture of a rake, and the apertures therethrough corresponding to the letters of the word "rake" are indicated in dotted lines by the appropriate letters R, A, K, E.

The disposition of the apertures 612 is such that each aperture 612 is operative for anywhere from two or more of the apertures 606, the latter being the letter selection apertures. An alphabet is printed on the panel, surrounding the rotary member, the letters having the same angular spacing as apertures 606. A "start" aperture and the card width take up the space of four apertures.

In use, the pointer 616 is engaged in that aperture 606 which is aligned with an arrow extending radially to the edge of disc 604, and the rotary member thereby rotated until pointer 616 registers with and drops through a hole 658 which is of the same diameter as the apertures 606 and lies radially aligned with the arrow designated "start" printed on panel 600. It will be understood that diameter of contact member 616 is such to afford a smooth sliding fit with apertures 606, 612 and 658. Thus when the two arrows have been aligned by registry of pointer 616 with aperture 658 a word may now be spelled. Assuming that such word is "rake" pointer 616 is pushed into the aperture 606 radially aligned with the letter R (not shown). The aperture 606 for the letter R then being engaged, the rotary member is swung in either direction until 616 again aligns with aperture 658 which is indicated by the fact that 616 will drop through that aperture. At that time one of the apertures 612 will be over the cutout 652 and in fact will be positioned directly over the letter R aperture in card 642. Contact point 616 is then withdrawn from aperture 658 and the 606 aperture which had designated the letter R. The disc remains in position and 616 is inserted into that 612 aperture which overlies cutout 652. The particular 612 aperture may be readily distinguished by arrows printed on disc 610, that arrow pointing most directly to the operator facing the board being indicative of the aperture through which pointer 616 is to be thrust. Thus 616 will pass through the R aperture in the card and engage the metal surface below to close the circuit to the lamp. The first letter being tested, contact pointer 616 is then withdrawn and inserted into that aperture 606 radially aligned with the letter A and again the rotary member is swung to line up that 606 aperture with the 658 aperture, the pointer withdrawn and inserted in whatever 612 aperture is indicated to be the proper one at that time. Accordingly, each letter in the word is selected and tested, the action being quite rapid.

The layout of the apertures 612 is such that except in one instance only one 612 aperture at a time will be over cutout 652. Accordingly, there can be no error as to which aperture will give a signal. In the sole excepting instance with the particular layout shown, the 612 apertures having the least and greatest radius will sometimes appear simultaneously over the cutout area 652. In such instances, which are rare, the respective arrows may not give a suitably clear indication as to which aperture 612 is to be used. Therefore in the operation of this particular device the rule is followed of using that aperture 612 having the longer radius and it has been found that such rule avoids the difficulty. It will of course, be apparent that as a matter of design it would be possible to have but one 612 aperture at a time over cutout 652. However a compromise was made in the particular design shown in Fig. 14 in order to use a letter spacing and a card size which would afford economy of materials and fairly large apertures in the cards as well as meeting various other conditions.

It will be appreciated that the particular embodiment will detect errors in letter sequence.

The form shown in Figures 17—20 comprises a cardboard panel 700 and wood reinforcing frame 702. A rotary cardboard disc 704 is mounted pivotally by an eyelet 706 having a rivet passing therethrough and securing a lead 708 for electrical connection from battery 709 to a flexible metal disc 710 cemented or otherwise secured to disc 704. Metal disc 710 is provided with a plurality of seven flexible tongues 712 cut therein and downwardly depressible by finger pressure at the juncture lines 714. Each tongue 712 has struck therefrom a contact lug 718 which protrudes into a slot 722 cut through disc 704 below each tongue 712, the inner edge 726 of each slot terminating below the juncture lines 714 so as to provide support ledges around which the respective tongues bend slightly when pressed.

Thus plate 710 provides a plurality of switches which may be selectively pressed to establish contact through apertures 728 in a selective picture card 730 to engage a metal plate 732 carried on a wood member 736 extending between two sides of frame 702 to which it is secured. Member 736 is provided with a bore 738 through which eyelet 706 passes. Plate 732 is connected by lead 742 to lamp 744, the other terminal of which is connected by a lead 748 to battery 709. Accordingly when any contact lug 718 goes through a card aperture 728 to engage plate 732 a series circuit is completed to energize lamp 744.

Picture card 730 is slidably removable and has printed thereon one or more pictures such as the nail and the numeral "9", as shown. Side flanges 730*a* and *b* are joined by fold lines (Figure 19) to the card, which flanges are removably insertable in the slots formed by the butt end of member 736 centered between the vertical sides 750 of a dado slot cut in the upper surface of bar 752 of the wood frame.

Panel 700 is provided with a rectangular cutout 756 extending the length of card 730, the edge 758 forming a limit stop as the card is inserted below disc 704. The dimensions are such that the card surface is substantially flush with or a little below the panel surface so as not to interfere with rotation of the disc 704 nor snag contact lugs 718 should they become bent downwardly or be depressed while the disc is rotated.

Disc 704 is provided with twenty-nine equally spaced finger holes 759, one of which is the "start" hole as designated by an arrowhead, which is directly registrable with an aperture 760 of substantially the same size provided in panel 704. Aperture 760 is indicated by dotted lines slightly larger than the "start" aperture of the disc in order to be visible, the apertures being in register.

Surrounding apertures 759 and radially aligned at all operating positions of disc 704 with twenty-six of the apertures are alphabet letters as shown printed on panel 704.

In use, a finger tip is used to line up the "start" hole on disc 704 with aperture 760. Then the first letter of the word to be spelled is selected and the radially aligned hole 759 brought around with a fingertip to register with aperture 760. At this time one of the tongues 712 will be uppermost; it is pressed to cause its contact lug 718 to engage plate 732 through a predetermined aperture 728. Each letter in turn is selected and tested in the same way. A signal is effected for each letter correctly selected by virtue of the completion of the series circuit as the contact lugs come into selective register over and are pressed manually into appropriate apertures 728. It is preferable that the contact lugs be normally out of engagement with the picture card to prevent wear of the card apertures and edges during rotation of the disc. However, they could be of sufficient length to slide on the card and protrude resiliently through the card apertures, so that depressing the tongues manually would not be necessary.

The layout of the tongues is preferably such that only one contact lug is over the aperture area of the card at a time, the uppermost tongue being understood as the one to be depressed in testing a selected letter. The contact lugs are spirally arranged to utilize the maximum aperture area to effect suitable spacing of the apertures on the card so as to minimize false signals. This is an important feature, since if all the lugs were at the same radius all apertures would be placed on the card on the same arc. While a short radius of placement could be utilized to effect five or six apertures on such arc, it is apparent that the possibility of false signals would be increased. An interesting aspect of such an arrangement might be the possibility of selecting words which could be spelled with use of a single aperture in the card.

In Figure 20 is shown a knob 770 having a stud 772 which has a slidable fit with apertures 759 and 760. Thus where a child's finger may be to small or too large to properly register the apertures, the tool of Figure 20 may be used to operate disc 704.

In the form of the invention shown in Figures 21 and 22 a cardboard panel 800 reinforced with a wood frame 802 secured thereto supports a removable rotatively secured apertured disc 804 of cardboard, on which is printed a plurality of selective pictures at angularly spaced points. Rotation of the disc so as to align a selected picture indicia 808 with an indicia mark 810 on the panel serves to bring certain of the apertures 814 of the disc below a removable rotary selector disc 820. Disc 820 is provided with six arcuately (or spirally) arranged apertures numbered "1" through "6" and into which is successively inserted the contact pointer 822 in spelling a word. The mode of use is in a manner suggested by the form shown in Figure 13, except that sequence error detection is realized by different positioning of the alphabet disc in Figure 13, while in Figure 21 it is effected by using a different aperture in the disc 820 for successive letters.

Disc 820 is rotatively secured in an aperture 821 of a cardboard front panel 826 fastened to an intermediate wood spacer strip 830 which is secured to the front margin of panel 800. Nailing, stapling or glueing may be utilized to fasten 800, 826 and 830 together in the formation shown in Figure 22, while a removable peg 834 retains disc 804 and fibre washer 836 supports the apex end of panel 826 and also serves as a pivot for disc 804. A washer 840 spaces disc 804 above panel 800 to provide easy rotation. Washers 836 and 840 may be fastened to disc 804, so that the entire rotary assembly is easily removable and insertable when changing the picture disc.

Fastened to and below the disc 820 is a cardboard retaining disc 844 which is apertured in register with "1"—"6" but is of a somewhat larger size than aperture 821 so that it retains disc 820 in the aperture 821.

Below picture disc 804 and concentric with selector disc 826 is a metal plate 848 secured as by cementing to panel 800. The electrical arrangement comprises a battery and lamp, plate 848 and contact pointer 822 all in series in a well known manner, so that engagement of the metal tip of the pointer with plate 848 energizes the lamp.

A circularly arranged alphabet printed on panel 800 surrounds disc 820; the spacing between letters is preferably the same as the angular spacing of apertures "1"—"6", or a multiple thereof.

In use, a picture is selected by rotating disc 804 with the fingertips until a selected picture thereon is in register with indicia 810. Then pointer 822 is inserted in aperture "1" and disc 820 rotated to align the aperture radially with the first selected letter of the word being spelled. At this time, pointer 822 will pass through some aperture 814 in disc 804 to engage plate 848 and light the lamp. The pointer 822 is then inserted in aperture "2" and disc 820 rotated to the second selected letter, and so on.

Words up to six letters may be spelled with this arrangement, as will be apparent.

In the event apertures "1"—"6" are spirally arranged, the angular spacing cam remain as shown but the radial printed lines from the apertures would be extended to reach the edge of the disc 820.

In the form of the invention shown in Figures 23 and 24, a cardboard panel 900 is secured to a reinforcing wood frame 902 and secured as by cementing are cardboard guide elements 906 and 910, the former being a rectangular strip having edge **906*a* while the latter has a circular cuotout 910*a*, of slightly more than 180° and guide edges 910*b* and 910*c*. An elongated picture card 914 similar to that shown in Figure 7 may thus lie drawn past the guide edges superimposed on a metal plate 918, or foil surface, cemented to panel 900, and which extends between the guide edges and across panel 900** in an uninterrupted surface.

Pivotally secured by metal eyelet 922 is a rotary cardboard disc 926. A fibre spacer washer 928 is utilized to provide suitable spacing so that card 914 may be easily inserted between disc 926 and metal surface 918. Carried on and secured to disc 926 is a flexible metal switch arm 932, on which is superimposed a cardboard shield 936, said arm having a contact tip 942. A space washer 938 is intermediate the switch arm and disc 926 and the assembly of elements 936, 932, 938 and 926 are securely fastened to each other as by cementing, riveting or stapling so as to be an integral composite member which is rotatable about the axis of eyelet 922. The eyelet must not be clinched to the point where manual rotation of disc 926 is impeded.

A metal rivet 940 passes through the eyelet and has a lead 944 soldered to it for connection to a battery. The arrangement is such that arm 932 has a closely fitting bore about eyelet 922, so as to make electrical contact therewith, which connection is carried from the eyelet to the rivet and thence to the battery. The rivet and eyelet may have a rotative fit or the eyelet and the switch arm may have a rotative fit in event the rivet is tightly clinched.

It will be apparent that when shield 936 is pressed, deflection of the switch arm will cause the contact tip 942 to go through an aligned aperture 946 in disc 926 and then through some registering aperture 948 of card 914. Thus contact 942 will engage plate 918 to close a series circuit comprising a lamp, the battery, and plate 918 which is shown as connected to one side of the lamp by a lead 950.

Selector disc 926 is provided with six arcuately arranged finger holes 952 for detection of errors in sequence of letters, the holes being designated as "1"—"6." The angular spacing is larger than the angular spacing of letters printed on an arc of somewhat less than 90°. The spacing arrangement is preferably such that finger hole "1" should be alignable with Z, with contact 942 not going past the lower edge of card 914, and hole "6" should be alignable with A, with contact 942 not going past said lower edge. Thus an area for disposition of an aperture through the card is assured for every letter of the alphabet regardless of whether that letter is the first or the last of a word to be spelled.

In the arrangement shown in Figure 23, the spacing between letters is purely illustrative, being obviously too great to accommodate 26 letters in the arc as shown, but for clarity in the drawing the large spacing is used. It is obvious that the arc between A and Z can be divided into twenty-five equal segments so as to have fully twenty-six equally spaced letters. Further, it can be demonstrated with a protractor that with the layout as shown, the indicia of hole "1" may be aligned with "2" without having contact 942 pass the lower edge of card 914, and likewise hole "6" can be aligned with A without having contact 942 pass the lower edge of the card.

In any event, suitable layout to meet the preferred condition is a matter of design to fit desired dimensions, the size and spacing of the finger holes being the chief determining factor.

In use, card 914 is slid to bring the indicia arrow of a selected picture with alignment with indicia mark 960 printed on guide 906. Then with the use of successively numbered finger holes each letter of the corresponding word is successively selected by rotating disc 926 and aligning the finger hole indicia with the letter indicia all in proper sequence. A test is made of each letter by pressing shield 936 to establish engagement of contact 942 through predisposed apertures 948, all in a manner as will be understood from the earlier description of other embodiments herein.

Having thus described my invention as disclosed in the several embodiments thereof in conjunction with illustrative figures, I now desire to disclose other possible variations. For example, the desirable electrical feature could conceivably be eliminated and various embodiments herein could be used by substituting printed dots for the card apertures and providing a peep hole as described in connection with Figures 2*a* and *b*.

Thus, for example, in Figure 4 a peep hole could be substituted for the push button 116; similarly in Figure 10. Figure 7 is inherently constructed for peep hole use as are Figures 14, 17, 21 and 23 by simply substituting a peep hole or holes for the electrical contact means. In the instance of Figure 14, the card slot would be arranged to bring the card into contiguity with panel 600. Further, various pivoted shields could be used in conjunction with the peep holes so as to hide the hole until the selector is fully positioned. In the case of Figures 1, 4 and 10, a plug could be used insertable in the peephole. Alternatively, the peep hole variation could be used with apertures in the cards, a brightly colored surface below the cards being visible through the peep holes.

In connection with certain embodiments wherein a stationary alphabet is used, consecutive numbered pegs of suitable size could be initially employed to indicate the sequence of letter selection. Thus if each letter has an adjacent perforation, a word is spelled by inserting the pegs in numerical order in selected letters. Then each letter may be tested after all the pegs are inserted. For a board designed to spell six letter words, a set of pegs numbered "1" through "6" would be furnished. In certain embodiments using a plurality of alphabets it would not be necessary to number the pegs. In those embodiments where a rotary alphabet is used having a perforation for each letter, the numbered pegs could be all inserted therein and individually withdrawn so that a contact pointer could be inserted. While the peg inserter system generally disclosed above would not be as desirable for sequence error detection as other systems shown herein, it could be used in conjunction therewith to achieve more convenient operation since all letters would first be selected and then all would be successively tested. It will, however, be appreciated that the peg system is not suitable for use with all the embodiments illustrated.

I claim:

1. A spelling device comprising a selector member restricted to rotary motion and an alphabet means having spaced selective letters arranged in a single arc about the axis of rotation of said selector member, said selector member being settable to rotated positions in accordance with selected letters, a card having a plurality of apertures therethrough corresponding to letters of a word, and contact means positionable by said rotary member for registering with said apertures, including a conductive surface engageable through said apertures by said contact means, and electrical elements effective to emit a signal responsive to said engagement.

2. A spelling device comprising a picture element having a series of perforations therethrough corresponding in position to respective letters of a word to be spelled, an oscillatable selector means restricted to pivotal motion about a fixed axis and alphabet means accurately associated therewith about said axis, a manipulatable contact element, said selector means being operative to indicate individual letters of said word on said alphabet means to determine the manipulatable position of said contact element in register with respective perforations corresponding to selected letters, a contact plate below said perforated picture element, said contact element being engageable with said contact plate through individual perforations, including means for emitting a signal at predetermined correctly selected positions of said alphabet means upon engagement of said contact element with said contact plate.

3. A spelling device as set forth in claim 2, wherein said contact element is carried by said selector means so as to be simultaneously movable with oscillation of said selector means.

4. A spelling device as set forth in claim 2, wherein said contact element comprises a flexible conductor movable independently of oscillation of said selector means.

5. A spelling device as set forth in claim 2, said selector means comprising a rotary disk-like member, the perforations for an individual word in said picture element being substantially concealable by said disk-like member and being disposed at varying radii with respect to said fixed axis.

6. An educational toy device comprising rotary disk-like selector means, selectable indicia means associated with said selector means and arcuately arranged with respect to the axis of rotation thereof wherein said selector means may be rotated to indicate selection of individual indicia means, means depicting a problem comprising an element having apertures therethrough wherein the disposition of said apertures is predetermined to correspond to respective rotated positions of said selector means in accordance with individual selected indicia, signal means comprising a signal element insertable in said apertures, said apertures being substantially concealable by said selector means and rendered accessible to said signal element by positioning of said selector means with respect to selected indicia means, wherein said rotary disk-like selector means is provided with at least one aperture alignable with apertures in said problem depicting element and wherein said signal element is insertable through said aligned apertures to control a signal emitting device, wherein said rotary disk-like member is provided with spaced indicia means sequentially registerable with said selectable indicia means in the selection of each indicia thereof so as to insure proper sequential selection of each aperture in said problem depicting element.

7. An educational toy spelling device comprising rotary disk-like letter selector means, selectable alphabet letters associated with said selector means and arcuately arranged with respect to the axis of rotation thereof wherein said selector means may be rotated to indicate sequential selection of individual letters, means depicting a word to be spelled comprising an element having apertures therethrough wherein the disposition of said apertures is predetermined to correspond to the letters of that word, successive rotative movements of said selector means in accordance with individual selected letters being effective to sequentially determine a plurality of operative positions of a signal means, signal means comprising a signal element insertable in said apertures, including a device for manifesting a signal upon each insertion, said apertures being substantially concealable by said selector means and rendered accessible to said signal element by positioning of said selector means with respect to selected indicia means.

8. A device as set forth in claim 7, wherein said selector means comprises a planar disk having a plurality of spirally arranged apertures individually alignable with predetermined apertures in said word depicting means, said signal element being insertable in two apertures thus aligned.

9. A device as set forth in claim 7, wherein said rotary disk-like selector means is provided with at least one aperture alignable with apertures in said word depicting means and wherein said signal element is insertable through said aligned apertures to control said signal manifesting device.

10. A spelling device comprising a picture element having a series of perforations therethrough corresponding in position to respective letters of a word to be spelled, an oscillatable selector means restricted to pivotal motion about a fixed axis and alphabet means arcuately associated therewith about said axis, a contact element, said selector means being operative to indicate individual letters of said word on said alphabet means and being effective to sequentially determine a plurality of signal manifesting positions of said contact element by registration with respective perforations corresponding to selected letters, a contact plate below said perforated picture element, said contact element being engageable with said contact plate through individual perforations, including means for emitting a signal at said determined positions by engagement of said contact element with said contact plate through said perforations.

11. A spelling device as set forth in claim 10, wherein said contact element is carried by said selector means so as to be simultaneously movable with oscillation of said selector means.

12. A spelling device as set forth in claim 10, wherein said contact element comprises a flexible conductor movable independently of oscillation of said selector means.

13. A spelling device as set forth in claim 10, said selector means comprising a rotary disk-like member, the perforations for an individual word in said picture element being substantially concealable by said disk-like member and being disposed at varying radii with respect to said fixed axis.

References Cited in the file of this patent

UNITED STATES PATENTS

| | | |
|---|---|---|
| 1,599,156 | Wilnin et al. | Sept. 7, 1926 |
| 1,932,994 | Tucker | Oct. 31, 1933 |
| 2,200,206 | Myers | May 7, 1940 |
| 2,505,230 | Composto | Apr. 25, 1950 |
| 2,539,077 | Hawkins | Jan. 23, 1951 |
| 2,591,327 | Witter et al. | Apr. 1, 1952 |
| 2,704,210 | Wolfe et al. | Mar. 15, 1955 |

FOREIGN PATENTS

| | | |
|---|---|---|
| 45,507 | Austria | Jan. 10, 1911 |
| 567,578 | Great Britain | Apr. 21, 1944 |
| 602,556 | Great Britain | May 28, 1948 |